G. D. POGUE.
LUBRICATING MECHANISM FOR PISTON MACHINES.
APPLICATION FILED MAR. 6, 1917.
1,231,294.
Patented June 26, 1917.
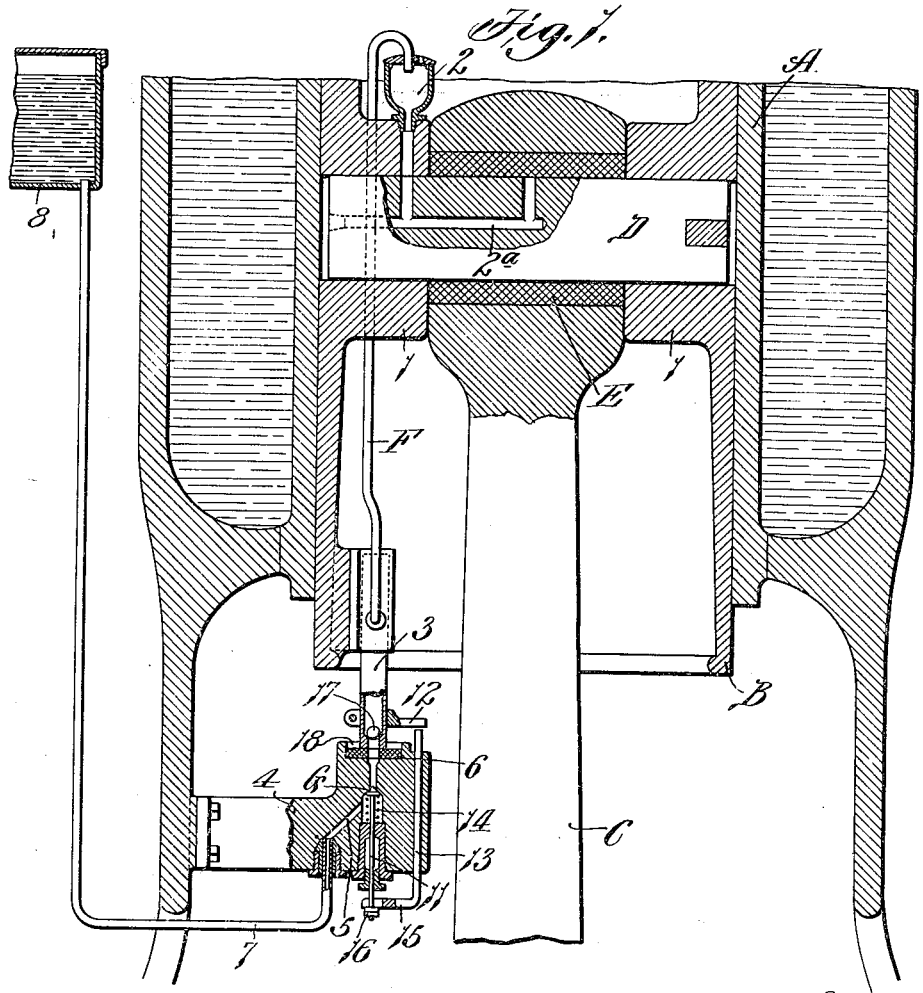
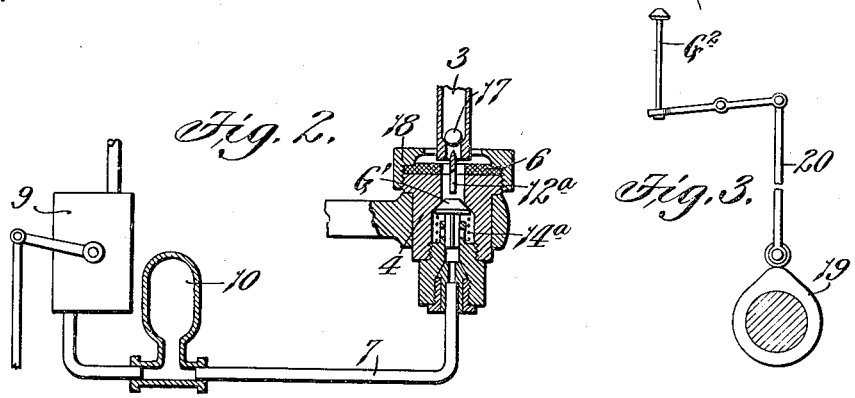
Inventor,
George D. Pogue.
By Bakewell Plume, Attys.

UNITED STATES PATENT OFFICE.

GEORGE D. POGUE, OF ST. LOUIS, MISSOURI.

LUBRICATING MECHANISM FOR PISTON-MACHINES.

1,231,294.  Specification of Letters Patent.  Patented June 26, 1917.

Application filed March 6, 1917. Serial No. 152,595.

*To all whom it may concern:*

Be it known that I, GEORGE D. POGUE, a citizen of the United States, residing at St. Louis, Missouri, have invented a certain new and useful Improvement in Lubricating Mechanisms for Piston-Machines, of which the following is a full, clear, and exact description, such as will enable others skilled in the art to which it appertains to make and use the same.

This invention relates to lubricating mechanisms for piston machines of the type in which the piston is provided with an oil conduit to which a charge of oil is supplied at each cycle of operations of the machine. In the prior lubricating mechanisms of this type with which I am familiar a pump was used for supplying oil to the oil conduit on the piston.

The main object of my present invention is to provide an efficient lubricating mechanism of the general type referred to which is more reliable, efficient and easier to maintain in operative condition than a mechanism provided with a pump for forcing the oil through the oil conduit carried by the piston.

To this end I have devised a lubricating mechanism for piston machines that comprises an oil conduit carried by or movable with the piston of the machine, a valve for admitting oil to said conduit, and means for actuating said valve intermittently when the machine is in operation. The oil controlled by said valve is under pressure, and the mechanism used for actuating said valve is preferably so constructed that the valve will open at each cycle of operations of the machine and will remain open for a small part of the stroke of the piston. The oil-controlling valve may be of any preferred type, and while various means may be used for operating said valve, I prefer to use a valve-operating mechanism that comprises a part that is carried by the piston or which moves with the piston.

Figure 1 of the drawings is a vertical sectional view of a portion of a piston machine equipped with a lubricating mechanism constructed in accordance with my invention.

Fig. 2 is a detail sectional view, illustrating a slight modification of my invention; and Fig. 3 is a detail view, illustrating still another form of my invention, wherein the valve is opened by a cam or other similar device having no connection with the piston.

Referring to Fig. 1 of the drawings, which illustrates the preferred form of my invention, A designates the cylinder of an engine or machine. B designates the piston that is reciprocatingly mounted in said cylinder, C designates the connecting rod which is pivotally connected to the piston in any suitable manner, as, for example, by means of a piston pin D mounted freely in a bearing E on the connecting rod and having its end portions keyed or secured in any other manner to lugs 1 on the interior of the piston. The piston A is provided with an oil conduit F through which oil is forced, either directly to the piston pin bearing, or to an oil reservoir 2 mounted on one of the lugs 1 on the interior of the piston and provided with a discharge orifice that communicates with oil-distributing ducts $2^a$ formed in the piston pin, as shown in Fig. 1. The particular construction of the oil duct F is immaterial, so far as my present invention is concerned, but I prefer to use an oil conduit whose lower end portion is formed by a tubular-shaped device 3 carried by the piston and arranged in such a manner that the lower end of same will abut a stationary element 4 in which an oil duct 5 is formed during part of the stroke of the piston B, a gasket or other suitable resilient device 6 being preferably arranged on the stationary element 4 so as to absorb the shock on the tubular-shaped device 3 on the piston and also form a tight joint between the device 3 and the stationary element 4 when said parts are in engagement with each other. Oil is supplied to the duct 5 in the stationary element 4 by means of an oil supply pipe 7, the oil in said supply pipe 7 being under pressure produced in any preferred manner, such, for example, as by arranging the reservoir 8 that contains the source of supply in a higher horizontal plane than the stationary element 4, as shown in Fig. 1, or by using a pump 9 to force the oil through the pipe 7, as shown in Fig. 2. When a pump is used to create and maintain the pressure in the supply pipe 7 it is preferable to arrange an air chamber 10 in the oil supply pipe 7, as shown in Fig. 2, so as to cause the intermittent or pulsating flow produced by the pump to be converted into a substantially continuous flow. At each cycle of operations of the machine oil is admitted from the oil duct 5 in the stationary member 4 into the tubular-shaped device 3 that forms part of the oil conduit on the piston, by means of a valve G that is normally seated and which is opened for a small part of the stroke of the piston B. In the form of my invention shown in Fig. 1, the valve G is carried by the stationary element 4 and is provided with a stem 11 which coöperates with a valve-operating mechanism formed by an actuating device 12 on the tubular-shaped device 3 carried by the piston and arranged in such a manner that it will engage and depress a rod 13 in the stationary element 4. The valve G is normally held seated by spring 14, and the valve-actuating rod 13 is provided at its lower end with an arm 15 that coöperates with a stop or abutment 16 on the stem of the valve to open the valve when said rod 13 is depressed by the actuating device 12 that moves with the piston, the parts being so arranged that the valve G will be held open for a small part of the stroke of the piston at each cycle of operations of the machine, thereby causing oil to be forced upwardly into the tubular-shaped device 3 that forms part of the oil conduit on the piston, said device 3 being provided with a check valve 17 of any preferred type, so as to prevent back flow of oil through the oil conduit on the piston.

In the form of my invention shown in Fig. 2 the means for opening the valve G' that governs the admission of the oil to the oil conduit on the piston consists of an extension or projection 12$^a$ on the tubular-shaped device 3, which is so arranged that it will engage the valve G' and unseat it after the lower end of the device 3 has engaged the gasket 6 on the stationary element 4 in which the valve G' is arranged, said valve G' being normally held seated by a spring 14$^a$. If desired, an oil collector 18 can be arranged on the stationary element 4, so as to collect any oil that escapes through the joint between the lower end of the tubular-shaped device 3 on the piston and the gasket which the lower end of said device abuts when the oil-controlling valve is open.

While I prefer to use a valve-operating mechanism comprising a part carried by or movable with the piston, this is not essential, as my broad idea consists of a lubricating mechanism comprising an oil conduit carried by or movable with the piston of a machine, a source of supply of oil under pressure and a valve that opens automatically at each cycle of operations of the machine, so as to admit oil from the source of supply to the oil conduit carried by or movable with the piston. In the form of my invention shown in Fig. 3 the oil-controlling valve G$^2$ is controlled by a valve-operating mechanism comprising a rotating cam 19 and a means 20 actuated by said cam and operatively connected with the stem of the valve G$^2$.

Having thus described my invention, what I claim, and desire to secure by Letters Patent, is:

1. A lubricating mechanism for piston machines, comprising an oil conduit movable with the piston of the machine, a stationary element provided with an oil passageway and arranged in such a manner that it will be engaged by said oil conduit during a part of the stroke of the piston of the machine, means for supplying oil under pressure to the passageway in said stationary element, a valve in said stationary element for controlling the passage of oil from the duct therein into said oil conduit, and means for opening said valve when said oil conduit is in engagement with said stationary element.

2. In a machine of the character described, a reciprocating piston, an oil conduit movable with said piston, a stationary element provided with an oil passageway and arranged in such a manner that the end of said oil conduit will abut same during part of the stroke of the piston, means for supplying oil under pressure to the passageway in said stationary element, a normally seated valve for governing the discharge of oil from said passageway, and means movable with the piston for opening said valve after said oil conduit has engaged said stationary element.

3. In a machine of the character described, a reciprocating piston, an oil conduit carried by said piston and provided at its lower end with a tubular-shaped device, a stationary element arranged in such a manner that it will be engaged by said tubular-shaped device during part of the stroke of said piston in one direction, a normally closed valve in said stationary element that governs an oil passageway in same which communicates with the oil conduit on the piston when said tubular-shaped device is in engagement with said stationary element, means for supplying oil under pressure to said valve, and means operated by the movement of the piston for opening said valve after said tubular-shaped device has engaged said stationary element.

4. In a machine of the character described, a reciprocating piston, an oil conduit carried by the piston and provided at its lower end with a tubular-shaped device, a stationary element provided with a resilient member which the lower end of said tubular-shaped device abuts during part of the stroke of the piston in one direction, an oil passageway in said stationary element, means for supplying oil under pressure to said passageway, a valve for controlling the discharge of oil from said passageway, and means carried by the piston for opening said valve after said tubular-shaped device has engaged said resilient member.

GEORGE D. POGUE.